July 22, 1958 R. MacGREGOR ET AL 2,844,117
DEVICE FOR PROTECTING SHIPS' HOLDS, WAGONS, DURING CARGO WORKING
Filed March 8, 1955 4 Sheets-Sheet 1

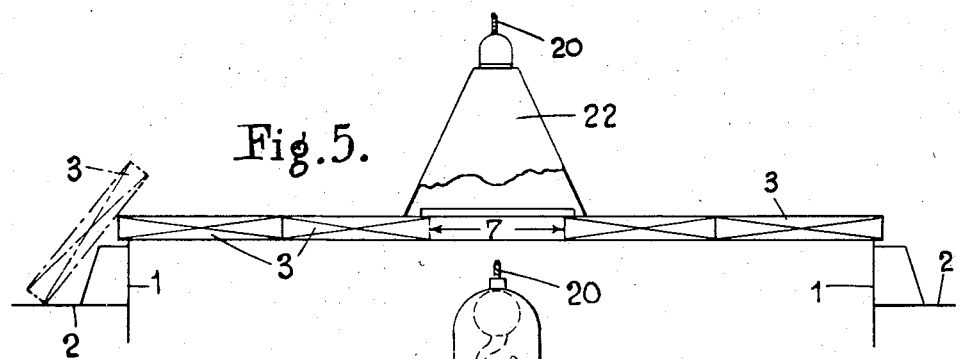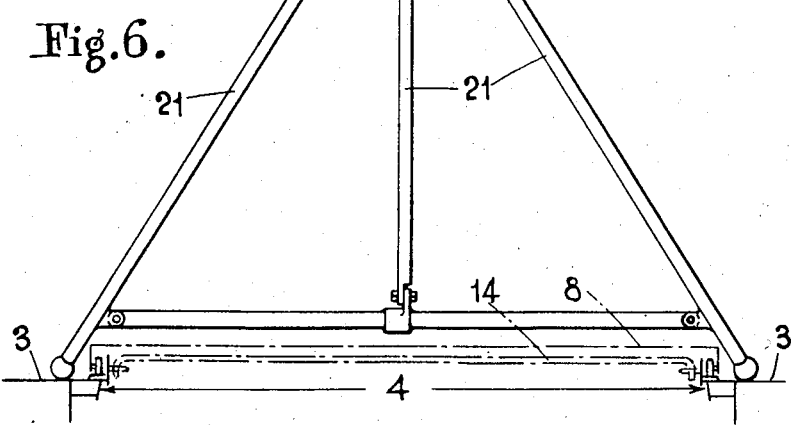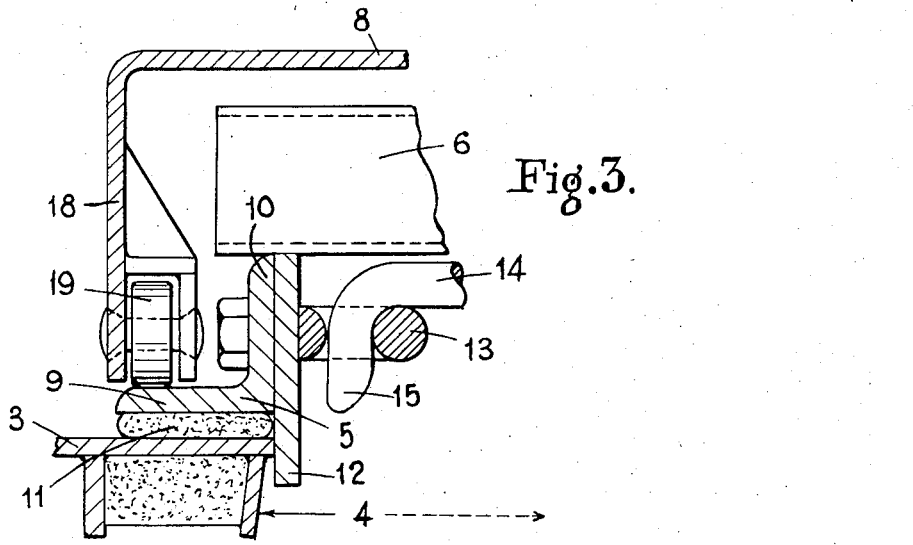

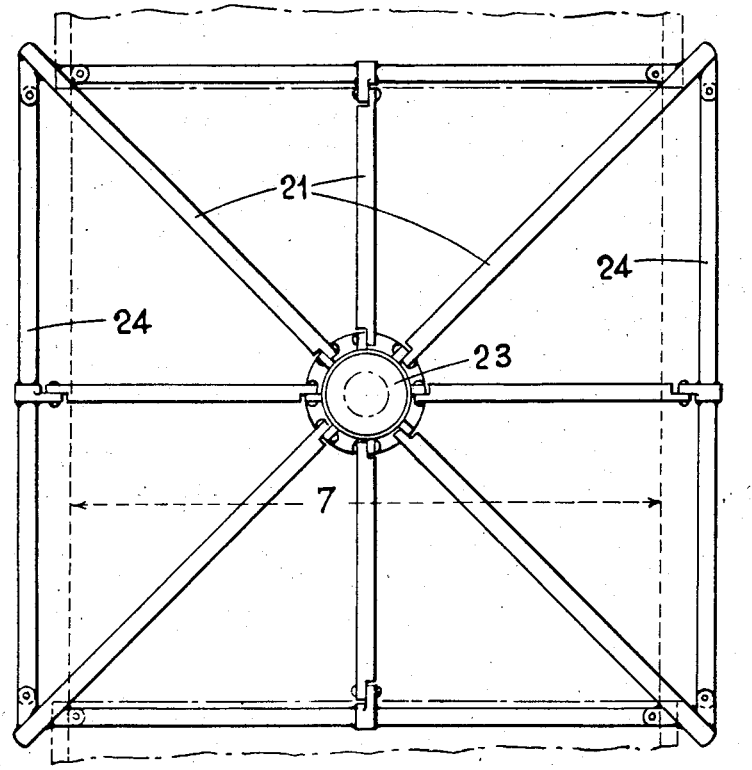
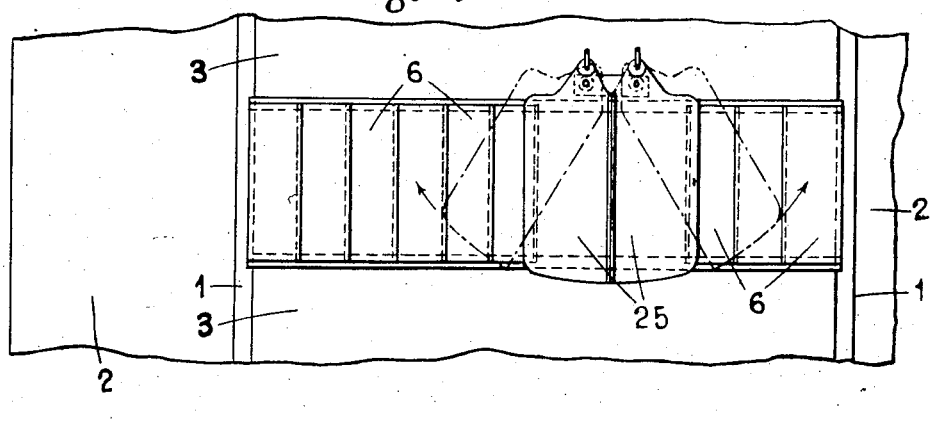

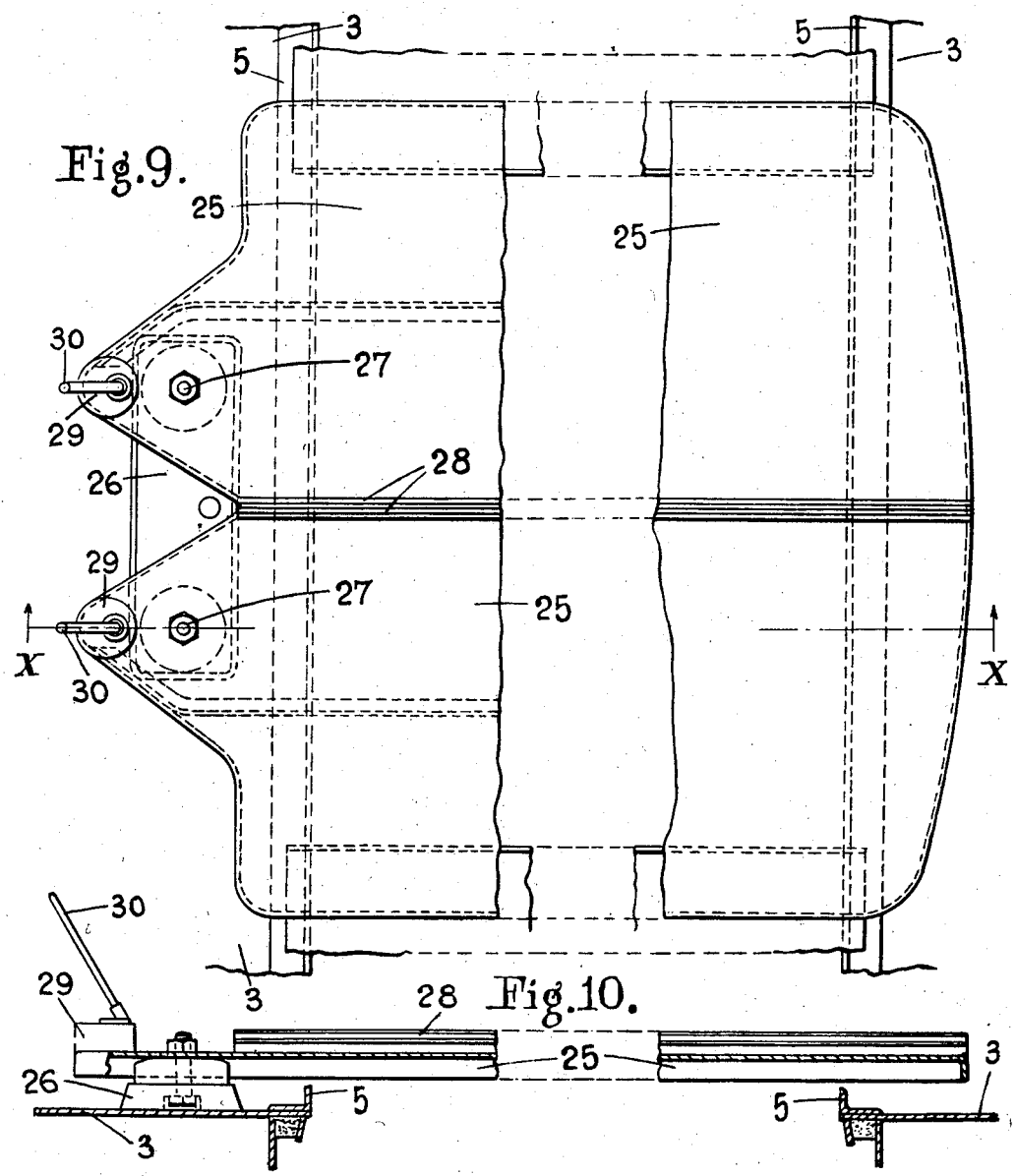

United States Patent Office 2,844,117
Patented July 22, 1958

2,844,117

DEVICE FOR PROTECTING SHIPS' HOLDS, WAGONS, DURING CARGO WORKING

Robert MacGregor and Joseph MacGregor, Monkseaton, Whitley Bay, England

Application March 8, 1955, Serial No. 493,014

Claims priority, application Great Britain October 14, 1954

5 Claims. (Cl. 114—202)

This invention concerns a method and a device for allowing the handling of goods aboard ships in any weather, comprising metal ships' hatch covers. This device applies particularly when several metal members or sections are employed and adapted to be moved independently to provide a hatch opening for working cargo, and is directed particularly to devices ancillary to the sections and having for their object to protect the hatch opening during bad weather conditions. A subsidiary object is to provide devices of this character which are sufficiently light and portable so as to be stowed in a minimum space when not in use to enable them to be carried and transported as part of the ship's gear.

The method according to the invention is remarkable notably in that it comprises the step of forming an opening leading to said storage space by displacing at least one of said movable panels, the step of covering temporarily and completely said opening by secondary panels of a light type, and the step of moving apart at least one of said secondary panels in order to form a gap of the desired extension during the time required for working cargo through said opening. In practice, the weather protection device according to the invention comprises a portable beam for attachment to each of the opposite edges of adjacent closing sections, for example hatch covers which have been moved apart to form a limited opening, a plurality of secondary cover plates for spanning between the portable beams and temporarily closing the limited opening, and one or more upper covers also spanning the portable beams and adapted to be superimposed over and to ride over the cover plates. The said upper covers may have means to facilitate travelling along the portable beams at the ends of the opening, or they may pivot clear at one end of opening to suit operation by one man.

Thus, when working cargo in bad weather, and in the case of conventional hatch cover sections which lift and roll along the coaming on eccentrically bushed wheels as well known, these sections are moved apart to provide a narrow opening at a desired position along the hatchway, the portable beams then being attached to provide runways along the edges of the two sections at the opening, and the secondary cover plates laid across the beams to shut the opening temporarily. One or more of the secondary cover plates is or are then removed to form a small opening and the said upper cover or covers moved into position along the beams to make a temporary "lid" over the small opening. When cargo is to be passed through the small opening, the lid is moved clear along the beams. There are advantageously two upper covers which can be moved apart from each other when uncovering the small opening.

The secondary cover plates are preferably flanged along opposite edges so as to interlock and slightly channelled to form gutters which drain on to the hatch cover sections between which they span. To facilitate the travel of the upper cover or covers along the portable beams they are made with downwardly depending side flanges sufficiently deep to raise them above the level of the interlocking cover plates, and although in a simple form it can be arranged that the edges of these flanges travel by a sliding action along the beams, it is preferred to provide each flange with a pair of wheels to roll along the beam, unless the pivoting previously mentioned is adopted.

In order that the said invention may be readily understood an embodiment thereof will be described by way of example with the aid of the accompanying drawings wherein:

Figure 3 is an enlarged section on the line III—III of Figure 1;

Figure 5 is a sectional elevation in schematic form of a hatch with a collapsible cargo cover;

Figure 6 is a an elevation of the framework of such a collapsible cover drawn to a larger scale;

Figure 7 is a plan view of Figure 6;

Figure 8 is a view somewhat similar to Figure 1 and showing a modified arrangement of upper covers;

Figure 9 is an enlarged view of the upper covers seen in Figure 8; and

Figure 10 is a section on the line X—X of Figure 9.

Like numerals of reference indicate the same or corresponding parts throughout all the views.

Figure 1:
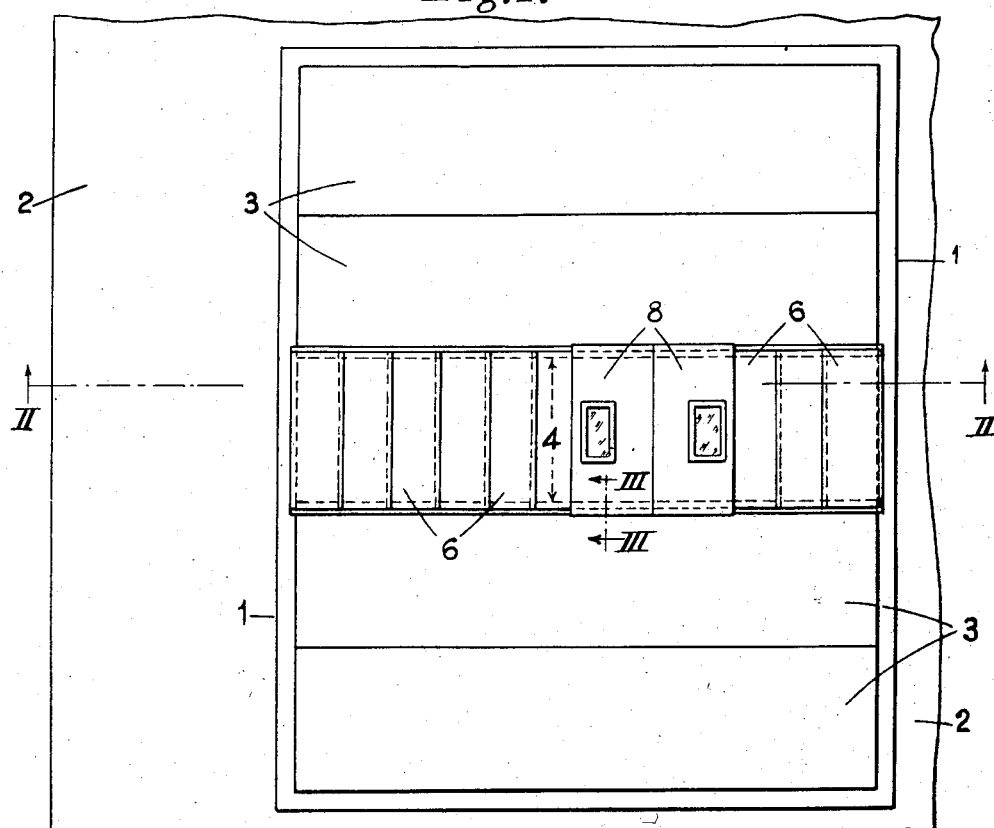
Figure 1 is a diagrammatic plan of a hatch with a weather protection device according to the invention.
Figure 2:
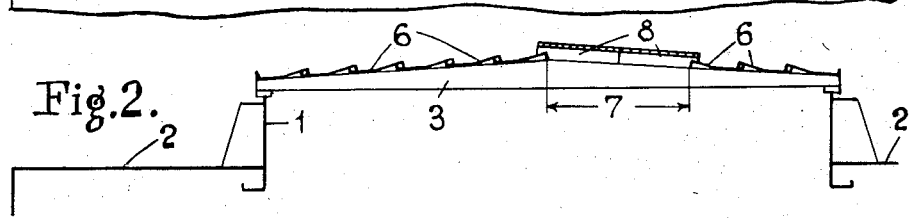
Figure 2 represents a section on the line II—II of Figure 1.

Referring to Figures 1 and 2 of the drawings the reference numeral 1 designates a hatch coaming and a weather-deck 2, and the hatch is covered by a number of separate metal closing sections 3 adapted to be rolled to the ends. When in the hatch closing position the sections abut with watertight athwartship joints. In the drawings, one section (not shown) has been rolled off the coaming and the remaining sections moved so as to leave a narrow hatchway opening 4 (Figure 1) between the opposed edges of two adjacent sections 3. The cover sections 3 may be connected together by wires or chains so that by pulling them apart, e. g. by a winch, a predetermined opening 4 is obtained. In the case of closing sections independent of each other, an opening 4 may be formed by displacing or opening merely one or several sections 3 and replacing same by an assembly of secondary cover sections. The main closing sections may be of course provided longitudinally or transversally with respect to the ship, be of the hinged type or of any other type.

A portable beam 5 (Figure 3) is laid along each of the opposed edges of the opening 4 and firmly attached in the manner hereinafter described. A plurality of secondary cover plates 6 rest on the portable beams, spanning the space therebetween, and some of these have been removed to form a small opening 7 (Figure 2) through which cargo can be worked. Over the small opening 7 are placed two upper covers 8 which are high enough to be superimposed and moved over the plates 6. In Figures 1–3 inclusive the said upper covers 8 are constructed so that they can travel along the two portable beams 5 between which they span.

Referring more particularly to Figure 3, it will be seen that the portable beam 5 is a right-angular section metal angle with horizontal and vertical flanges 9 and 10 respectively, and the former has a layer of soft jointing material 11 such as sponge rubber applied to its outer face which seats on the edge of the hatch cover section 3 to make a watertight seal. The vertical flange 10 has a plate fixed to its outer face to provide a lip extension 12 to lie against the edge of the hatch cover section 3. An eye 13 is fixed to the combined vertical flange 10 and lip plate 12, i. e. on the outer face of the flange, and a spacing stay 14 having hook ends 15 is provided for spanning between opposite beams 5; the hook ends 15 then engaging the opposite eyes 13. The combination of lip 12 pressing against the edge of the cover section 3 and the stay device 13, 14, 15 provide a firm attaching means to prevent displacement of the beams 5.

Figure 4:
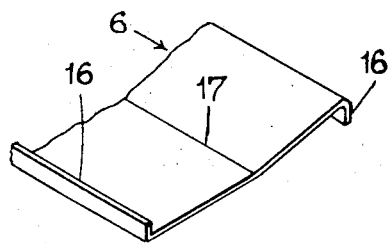
Figure 4 shows a fragment at the end of a cover plate drawn to a scale larger than the diagrams of Figures 1 and 2, but smaller than the scale of Figure 3.

The secondary cover plates 6 are made to interlock one with the other, for example by means of the reversely turned flanges 16, one along each edge (see Figure 4) and they are also longitudinally bent at 17 to form a shallow channel. Each plate 6 therefore forms a draining gutter, any water running along on to the adjacent cover sections 3. The section given to the cover plates 6, which may differ of that shown, is preferably provided for allowing to nest easily these secondary panels closely together for stowage.

The upper covers 8 are formed with downwardly depending side flanges 18 (Figure 3) and on the inner faces of these flanges a pair of wheels 19 are mounted to facilitate rolling the upper covers along the horizontal flanges 9 of the portable beams 5. The downwardly depending flanges 18 are spaced apart wider than the ends of the secondary cover plates 6 so as to enclose the same, and thus the upper covers 8 may be freely moved along the beams 5 over the tops of the plates 6, which rest on the top edges of the respective vertical flanges 10 of the portable beams.

Referring to Figures 5, 6 and 7, there is illustrated the use of a collapsible cover 22 used in the manner of an umbrella, for mounting on the cargo runner 20 so as more completely to protect the small hatch opening 7. This collapsible cover comprises a number of spokes 21 pivoted to a centre plate 23 so that they can be collapsed together as a close bundle. In the expanded position, they are held apart by a bottom frame work made up of the bars 24. The framework so formed is covered by a skin of any suitable flexible material which may have windows. When lowering the cargo, the base of the cover rests on the sections 3 whereupon the cargo runner 20 continues lowering through the centre plate 23.

In Figures 8, 9 and 10 there is illustrated an alternative arrangement of the upper covers (designated 25 in these figures) wherein the rolling of the same along the portable beams 5 is obviated. In this modified form a portable block 26 is designed to rest on the cover section 3 and a pair of upper covers 25 are pivoted thereto at 27. In the closed position as shown in full lines in Figure 8, the covers 25 abut together for example along upturned lips 28, and the opening between the plates 6 can be uncovered by opening the upper covers 25 V-wise about their pivots. Counterbalance weights 29 are mounted on short overhanging ends of the covers 25, while two operating levers 30 are provided for operating these panels and adapted to be worked by a single man. Any other working device for these panels may be contemplated. The device which has been described may of course be similarly applied according to a same principle to roofs of wagons or similar vehicles.

It should be distinctly understood that the invention is in no way limited to the specific forms and embodiment and details of construction illustrated and described, and that various alterations, omissions, and additions may be made therein, therefrom and thereto without exceeding the scope of the invention as defined in the ensuing claims.

What is claimed is:

1. Cover device for cargo openings in ship's hatches, railway wagons and the like of the type comprising a series of adjacently aligned movable main cover sections extending across the entire width of said opening, for completely closing said opening and forming a gap between two adjacent main sections by pushing them aside for the passage of the cargo through said hatch, a series of smaller dimensioned complementary cover sections adjacently aligned in a direction which is substantially perpendicular to the direction of alignment of said main cover sections, said smaller sections being supported by the said main sections and spanning said gap, at least one third light section superimposed to and riding over said complementary sections in parallel relationship with said latter sections and a second gap formed by pushing aside two of said complementary sections on the very spot where it is desired to lower the cargo, said light sections temporarily spanning said second gap, and further two portable beams temporarily located on and attached to each of the opposed edges of two adjacent main cover sections after these latter have been moved apart to form said gap therebetween, the said complementary and light covers being adapted to rest on said portable beams.

2. In a cover device for cargo openings in ship's hatches, railway wagons and the like, of the type comprising a series of adjacently aligned movable main cover sections extending across the entire width of said opening, for completely closing said opening, and to form a gap between two adjacent main sections by pushing them aside for the passage of the cargo through said hatch, a series of smaller dimensioned complementary cover sections adjacently aligned in a direction which is substantially perpendicular to the direction of alignment of said main cover sections, said smaller cover sections being supported by the said main cover sections and spanning said gap, at least one third light cover section superimposed to and riding over said complementary sections in parallel relationship with said latter sections and a second gap formed by pushing aside two of said complementary sections on the very spot where it is desired to lower the cargo, said light sections temporarily spanning said second gap, two portable beams temporarily located on and attached to each of the opposed edges of two adjacent main sections after these latter have been moved apart to form said gap therebetween said light sections having a greater length than the said complementary section and being provided with downwardly directed side flanges extending below said complementary sections and with rolling means mounted on said flanges, said rolling means riding on said beams in a superimposed position with respect to said complementary sections.

3. A device according to claim 1 wherein the length of said complementary sections is substantially equal to the width of one of said main sections.

4. A device according to claim 1 wherein the said light cover sections consist of a pair of pivoted elements adapted to be opened V-wise.

5. A device according to claim 1 wherein the portable beams are formed by right-angular metal angles with horizontal and vertical flanges, a soft jointing material on the outer face of said horizontal flange, said jointing material being adapted to seat on the corresponding main cover, and a lip shaped extension on said vertical flange adapted to lie against the edge of the said main cover.

References Cited in the file of this patent

UNITED STATES PATENTS

| 1,072,611 | Hayes | Sept. 9, 1913 |
| 2,118,191 | Goldsmith | May 24, 1938 |
| 2,398,289 | Crocker | Apr. 9, 1946 |
| 2,750,914 | MacGregor et al. | June 19, 1956 |

FOREIGN PATENTS

| 90,167 | Germany | Jan. 15, 1897 |
| 158,323 | Great Britain | Jan. 31, 1921 |
| 934,249 | France | Jan. 10, 1948 |